United States Patent [19]

Dieck et al.

[11] 4,369,280

[45] Jan. 18, 1983

[54] POLYBUTYLENE TEREPHTHALATE MOLDING COMPOSITIONS AND ARTICLES MOLDED THEREFROM

[75] Inventors: Ronald L. Dieck, Sunnyvale, Calif.; Frank N. Liberti, Mt. Vernon, Ind.; Allen D. Wambach, Monroeville, Pa.

[73] Assignee: General Electric Company, Pittsfield, Mass.

[21] Appl. No.: 289,906

[22] Filed: Aug. 4, 1981

[51] Int. Cl.$^3$ .............................................. C08K 5/06
[52] U.S. Cl. ...................................... 524/281; 524/371; 524/412; 524/513; 525/146; 525/148; 525/176; 525/177
[58] Field of Search ............... 525/146, 148, 176, 177; 260/40 R, 45, 95; 524/371, 412, 513, 281

[56] References Cited

U.S. PATENT DOCUMENTS

| | | | |
|---|---|---|---|
| 2,465,319 | 3/1949 | Whinfield et al. | 525/177 |
| 3,751,306 | 8/1973 | Gall | 525/177 |
| 3,833,685 | 9/1974 | Wambach | 525/177 |
| 3,937,757 | 2/1976 | Seydl et al. | 525/177 |
| 4,013,613 | 3/1977 | Abolins et al. | 525/177 |
| 4,034,013 | 5/1977 | Lane | 525/177 |
| 4,034,016 | 5/1977 | Baron et al. | 525/177 |
| 4,035,333 | 5/1977 | Kamada et al. | 525/177 |
| 4,044,073 | 8/1977 | Baron et al. | 525/177 |
| 4,096,202 | 6/1978 | Farnham et al. | 525/177 |

*Primary Examiner*—J. Ziegler
*Attorney, Agent, or Firm*—Hedman, Casella, Gibson & Costigan

[57] ABSTRACT

Polybutylene terephthalate molding compositions which contain a small amount of ethylene-ethyl acrylate copolymer, or an ethylene-vinyl acetate copolymer, or a mixture of these copolymers, and optionally polyethylene, provide moldings which in preferred embodiments possess improved impact resistance and lower specific gravity, without more than negligible loss of other properties. Other conventional modifiers can be present.

19 Claims, No Drawings

POLYBUTYLENE TEREPHTHALATE MOLDING COMPOSITIONS AND ARTICLES MOLDED THEREFROM

The present invention relates to polybutylene terephthalate molding composition containing one or more vinyl polymers as adjuvants to provide moldings of improved impact resistance and lower specific gravity, without more than negligible loss of other properties. The invention includes articles molded from the compositions.

BACKGROUND OF THE INVENTION

It is known that high molecular weight polybutylene terephthalate resins are uniquely useful as the principal components of compositions for the production of molded articles by the blow mold, injection molding and extrusion methods; see Winfield U.S. Pat. No. 2,465,319. The compositions find principal use in the production of television and radio sets, housings for kitchen appliances and hand tools, bottles, and parts for electric motors and automobile engines. Much effort has been expended in improving these compositions to improve the impact resistance of articles molded therefrom; see Lane U.S. Pat. No. 4,034,013; Baron et al. U.S. Pat. Nos. 4,034,016 and 4,044,072; and Farnharm et al. U.S. Pat. No. 4,096,202. Efforts have also been made to improve these compositions for electrical insulating purposes, and Seydl et al. U.S. Pat. No. 3,937,757 discloses that the "tracking" resistance of articles molded from polybutylene terephthalate molding compositions is improved when the compositions have a content of 5% to 50% by weight of a polyolefin component, which can be polyethylene, a poly(ethylene-vinyl acetate), a poly (ethylene-acrylate), and mixtures thereof. "Tracking resistance" is the ability of a molded article to resist formation of conductive tracks of carbonized material when an electrical arc is established on the surface of an article. Abolins U.S. Pat. No. 4,013,613 discloses similar compositions which, however, require a reinforcing filler.

The discovery has now been made that polybutylene terephthalate molding compositions which contain a small amount of an ethylene-ethyl acrylate copolymer, an ethylene-vinyl acetate copolymer, or a mixture of the two copolymers, and optionally polyethylene, the total weight of said copolymer or copolymers and said polyethylene (when present) being less than 5% but more than 0.1% of the weight of said composition, provide molded articles which in preferred embodiments possess greatly improved impact resistance and lower specific gravity, without more than negligible sacrifice of other properties.

The polybutylene terephthalate which is the principal polymeric component in the compositions of the present invention can be any of the polymers of this group or mixtures thereof. The polybutylene terephthalate which is present in the compositions of the present invention is preferably of such high molecular weight that it has an intrinsic viscosity of at least 0.6 and preferably about 0.8 dl./g. measured in a mixture of phenol and sym-tetrachloroethane in 3:2 by weight ratio at 30° C. and a maximum viscosity of about 1.5 dl./g. Polymers having an intrinsic viscosity in the range of 0.8 to 1.2 dl./g. are preferred for injection molding applications since these polymers provide molded articles of excellent toughness and impact resistance.

The ethylene-ethyl acrylate and ethylene-vinyl acetate copolymers which are present in the compositions of the present invention are composed of ethylene and ethyl acrylate (or vinyl acetate) units in 10:1 to 1:10 molar ratio and preferably in 3:1 to 1:3 molar ratio. The polymers have molecular weights in the range where they are spinnable on the one hand and extrudable at ordinary temperatures on the other hand, that is, molecular weights between about 100,000 and 1,000,000.

The optional polyethylene is likewise of high molecular weight, in the range of 50,000 to 500,000.

The compositions of the present invention can and advantageously do contain some or all of the supplementary components which are customarily present in thermoplastic polyester molding compositions.

Thus they can advantageously contain one or more fibrous reinforcing agents, for example asbestos fibers, graphite fibers, cotton, silk, metal "whiskers" and the like. Because of their ready availability and the excellent increase in impact resistance which they impart, glass fibers (chopped to about ¼" or less) are preferred. In addition, the composition can contain one or more pigments, for example titanium dioxide and barium sulfate whites, ultramarine and phthalocyanine blues, chrom green, carbon black and nigrosine black; mineral fillers for example talc, mica and, preferably, clay; flame retardants such as decabromodiphenyl ether and the other fully brominated aryl compounds disclosed in U.S. Pat. No. 3,751,396 alone or in admixture with $Sb_2O_3$ and similar compounds as disclosed in U.S. Pat. Nos. 3,833,685 and 4,035,333; blowing agents; mold release agents; and stabilizers.

With regard to the proportions of the supplementary additives, the amount of fibrous reinforcing agent which is present can be as little as 1% or as much as 60% or more of the weight of the composition, amounts in the range of 5% to 50% being preferred. The fire retardant (or combination of fire retardants) is preferably present in amount between 1% and 20% of the weight of the composition as larger amounts detract from the properties of the moldings, and less than 1% confers little or no benefit. The remaining additives are present in customary minor amount.

The compositions of the present invention can be prepared in any conventional manner as, for example, by dry mixing the components in granular or powder form. The mixture can be extruded in the form of strands which after cooling can be chopped or otherwise comminuted into granular or powder form. The last procedure is specially advantageous because the particles so produced are uniform and remain uniform in composition on storage and transportation, so that differential settling during transportation does not occur.

Shaped articles can be molded from the compositions by any of the techniques heretofore used for the purpose. Temperatures and molding cycles in general conform with those presently employed for the production of moldings from polybutylene terephthalate based compositions. The most suitable temperature in any instance, however, is best determined by laboratory trial as this temperature varies with the molecular weights of the particular polybutylene terephthalate resin (and other resins) which are present, the presence of cross linkages and branching components as is shown in Cohen et al., copending U.S. application Ser. No. 957,801, and the flow characteristics which are desired, taking into account the dimensions and complexity of the mold. In most instances the compositions can be injection molded in an injection molding machine at a cylinder temperature of 250° C. and a mold temperature of 75° C. with a 60-second molding cycle.

The invention is further illustrated by the examples which follow. These examples represent best embodiments of the invention and are not to be construed in limitation thereof. Parts are by weight except where otherwise stated.

EXAMPLE 1

The following illustrates the effect of a small amount of a poly(ethylene-ethyl acrylate) as modifier which improves the impact resistance of a polybutylene terephthalate molding.

A. A molding composition is prepared by co-extrusion and pelletization the following components in finely-divided form:

| Components | Parts |
|---|---|
| Poly-(1,4-butylene terephthalate)[1] | 95.3 |
| Poly(ethylene-ethyl acrylate) copol.[2] | 4.5 |
| Stabilizers | 0.2 |

[1]VALOX 310 of General Electric Co.
[2]PT-3085 of Union Carbide Co.

The extruded pellets are injection molded into ⅛" thick test specimens that are tested to determine the impact resistance by the Izod and Gardner methods.

B. Procedure A is repeated except that the poly(ethylene-ethyl acrylate) is omitted and the amount of the poly(1,4-butylene terephthalate) is increased to 99.8 parts.

Results are as follows.

| | | Izod (ft.-lb./in.) | | |
|---|---|---|---|---|
| Run | Modifier | Notched | Unnotched | Gardner |
| A | Poly(ethylene-ethyl acrylate) | 1.4 | No break | 430 |
| B | None | 1.0 | No break | 300 |

EXAMPLE 2

A molding composition is prepared from 80 parts of the molding composition of Example 1-A and 20 parts of chopped glass fibers as reinforcing component. Tests samples are molded by the method of Example 1, which show improved impact resistance.

EXAMPLE 3

A molding composition is prepared from 85 parts composition of Example 1-A, 15 parts of chopped glass fibers, and 15 parts of a 1:2 mixture of $Sb_2O_3$ and decabromodiphenyl ether as fire retardant. Test strips are extruded by the method of Example 1, which show improved impact resistance and satisfactory combustion resistance.

EXAMPLE 4

The following illustrates the improved impact resistance of moldings based on polybutylene terephthalate and containing a small amount of poly(ethylene-vinyl acetate) and reinforcing glass fibers.

A. The following materials in granular form are dry co-extruded and pelletized to form a molding composition:

| Component | Parts |
|---|---|
| Poly(1,4-butylene terephthalate) - General Electric Co. | 80 |
| Poly(ethylene-vinyl acetate) - Alathon 3892 | 3 |
| Polyethylene (Microthene FN 310) | 2 |
| Glass fibers (chopped) | 15 |

The compositions are injection molded into test specimens ⅛" thick, after which their impact resistance is determined by the Izod method.

B. The procedure is repeated except that the poly(ethylene-vinyl acetate) and the polyethylene are omitted, and the amount of the poly(1,4-butylene terephthalate) is increased to 85 parts. Results are as follows.

| | Modifiers | | Izod (Ft.-lb./in.) | |
|---|---|---|---|---|
| Run | PEVA* | PE** | Notched | Unnotched |
| A | 3% | 2% | 1.8 | 12.0 |
| B | None | None | 0.8 | 6.6 |

*Poly(ethylene-vinyl acetate).
**Polyethylene.

EXAMPLE 5

The procedure of Example 4-A is repeated except that 10 parts of the poly(1,4-butylene terephthalate) are replaced by 10 parts of poly(ethylene terephthalate). Results are substantially the same.

EXAMPLE 6

The following molding compositions are prepared.

| | Parts | | | | | |
|---|---|---|---|---|---|---|
| Run | PBT[(1)] | PEVA[(2)] | Stabilizers[(3)] | PEEA[(4)] | PEEA[(5)] | PEEA[(6)] |
| A | 95.3 | 4.5 | 0.2 | — | — | — |
| B | 95.3 | — | 0.2 | 4.5 | — | — |
| C | 95.3 | — | 0.2 | — | 4.5 | — |
| D | 95.3 | — | 0.2 | — | — | 4.5 |

[(1)]Poly(1,4-butylene terephthalate) Valox 310, General Electric Co.
[(2)]Poly(ethylene-vinyl acetate) - Alathon 3892
[(3)]Conventional antioxidant-stabilizer combination
[(4)]Poly(ethylene-ethyl acrylate) copolymer-P7967 - Union Carbide
[(5)]Poly(ethylene-ethyl acrylate) copolymer-PT 7709 - Union Carbide
[(6)]Poly(ethylene-ethyl acrylate) copolymer Pt-3085 Union Carbide The compositions are injection molded by standard laboratory procedure to provide test pieces, which have the following properties.

| Property | A | B | C | D |
|---|---|---|---|---|
| Impact resistance: | | | | |
| Izod, notched, ft.-lb./in. | 1.4 | 1.2 | 1.2 | 1.4 |
| Izod, unnotched, ft.-lbs./in. | 5NB[1] | 5NB[1] | 5NB[1] | 41.3;2NB[1] |
| Gardner, dislodge, in.-lb. | 430 | 450 | 390 | 395 |
| Strength: | | | | |
| Flexural strength, psi | 12,000 | 12,500 | 12,400 | 12,4000 |
| Flexural modulus, psi | 324,000 | 333,000 | 329,000 | 328,000 |
| Tensile strength, psi | 6830 | 6960 | 7200 | 7380 |
| Specific gravity | 1.284 | 1.284 | 1.283 | 1.284 |
| Melt viscosity, Pell, 250° C. | 5,690 | 5,910 | 5,710 | 5,600 |
| Tensile Elongation, % | 355 | 334 | 306 | 283 |
| DTUL[2], °F., 264 psi | 124 | 126 | 122 | 132 |

[1]Not broken.
[2]Deflection temperature under load.

EXAMPLE 7

| Components | Parts |
|---|---|
| Poly(1,4-butylene terephthalate | 84.8 |
| Glass fibers, chopped | 15.0 |
| Stabilizers | 0.2 |

Aliquots of this batch are taken. One aliquot is not modified, and is processed as control (column A below). The remaining aliquots are modified by addition of poly(ethylene-vinyl acetate), polyethylene, or a mixture of the two, as shown in columns B–F below.

The compositions are in a 1¾" Sterling extruder and then are molded in a 3-oz. Van Dorn molding machine extruder to form test pieces which are tested according to standard laboratory procedure.

The procedure is repeated starting with a different master batch of the same materials obtained at a different time, providing the results shown in columns AA, BB and CC below.

Results are as follows.

|  | Run |  |  |  |  |  |  |  |  |
|---|---|---|---|---|---|---|---|---|---|
|  | A | B | C | D | E | F | AA | BB | CC |
| Composition, parts |  |  |  |  |  |  |  |  |  |
| PBT master batch[1] | 100 | 98 | 93 | 93 | 91 | 91 | 100 | 96 | 95 |
| PEVA[2] | 0 | 0 | 5 | 7 | 9 | 7 | 0 | 2 | 3 |
| PE[3] | 0 | 2 | 2 | 0 | 0 | 2 | 0 | 2 | 2 |
| Properties |  |  |  |  |  |  |  |  |  |
| Impact strength: |  |  |  |  |  |  |  |  |  |
| Izod, notched, ft.-lb./in. | 0.77 | 1.17 | 1.60 | 1.91 | 1.94 | 2.11 | 0.80 | 1.31 | 1.79 |
| Izod, unnotched, ft. lb./in | 6.6 | 11.0 | 11.3 | 11.2 | 11.3 | 11.8 | 6.6 | 9.6 | 12.0 |
| Gardner, in. lbs. |  |  |  |  |  |  |  |  |  |
| Bottom | 12 | 12 | 20 | 16 | 24 | 16 | 12 | 20 | 16 |
| Top | 32 | 40 | 60 | 64 | 80 | 64 | 28 | 40 | 64 |
| Dislodge | 32 | 68 | 72 | 92 | 96 | 100 | 32 | 64 | 88 |
| Tensile strength, $10^3$ psi | 12.6 | 13.2 | 12.4 | 11.9 | 11.3 | 11.9 | 13.0 | 13.0 | 13.3 |
| Flexural: |  |  |  |  |  |  |  |  |  |
| Strength, $10^3$ psi | 19.3 | 19.8 | 18.4 | 16.7 | 16.2 | 17.1 | 20.9 | 20.0 | 20.1 |
| Modulus, $10^3$ psi | 583 | 599 | 562 | 526 | 491 | 510 | 597 | 565 | 581 |
| Tensile Elongation, % | — | — | — | — | — | — | 6.5 | 6.1 | 6.0 |
| Specific gravity | 1.413 | 1.404 | 1.383 | 1.373 | 1.358 | 1.370 | 1.414 | 1.390 | 1.392 |
| DTUL[1], °F., 264 psi | 378 | 388 | 393 | 392 | 378 | 390 | 383 | 392 | 398 |
| 66 psi | — | — | — | — | — | — | 424 | 430 | 427 |
| Melt viscosity, poises | 7,240 | 7,870 | 8,050 | 8,080 | 7,180 | 8,480 | 6,720 | 7,090 | 6,890 |
| Shrink, mils/in., 4" × ⅛" disc | 11 | 11 | 11 | 11 | 11 | 11 | — | — | — |

[1]See text above.
[2]Poly(ethylene-vinyl acetate).
[3]Polyethylene (Microthene FN-510).
[4]Deflection temperature under load.

In the above example, Runs D, E, and F contain amounts of modifiers beyond the scope of the invention, and are included for control purposes. While amounts of the ethylene-vinyl acetate copolymer in excess of 5% have a beneficial effect on the impact strength of the compositions, compositions containing such larger amounts have significantly reduced flexural strength and modulus.

On the other hand, a comparison of Runs BB and CC with the control Run AA shows that compositions within the scope of the invention have significantly improve impact strength yet retain to a significant degree the excellent flexural strength and modulus of the control composition Run AA.

All of the above-mentioned patents and/or patent applications are incorporated herein by reference. Obviously, other modifications and variations of the present invention are possible, in the light of the above teachings. For example, as flame retardant components there can be used tetrabromobisphenol A/ bisphenol A copolycarbonate and antimony oxide; tetrabromobisphenol A carbonate oligomer capped with tribromophenol and antimony oxide, and the like. It is therefore to be understood that changes may be made in the particular embodiments of the invention described which are within the full intended scope of the invention as defined by the appended claims.

We claim:

1. A polybutylene terephthalate molding composition which provides moldings of improved impact resistance, containing a component selected from the group consisting of ethylene-ethyl acrylate copolymers, ethylene-vinyl acetate copolymers, and mixtures of said copolymers; the weight of said component being between 0.1% and 4.5% of the weight of said composition, the molar ratio of said ethylene to each of said ethyl acetate and to said vinyl acetate being between 1:10 and 10:1, and the molecular weight of said copolymers being between 100,000 and 1,000,000.

2. A molding composition according to claim 1 wherein said poly(butylene terephthalate) is poly(1,4-butylene terephthalate).

3. A molding composition according to claim 1 wherein said component is an ethylene-ethylene acrylate copolymer.

4. A molding composition according to claim 1 wherein said component is an ethylene-vinyl acetate copolymer.

5. A molding composition according to claim 1 wherein the molar ratio of said ethylene to each of said ethyl acrylate and said vinyl acetate is between 3:1 and 1:3.

6. A molding composition according to claim 1 wherein the weight of said component is between 1% and 4.5% of the weight of said composition.

7. A molding composition according to claim 1 containing between 0.1% and 4.5% by weight of polyethylene.

8. A molding composition according to claim 1 containing between 1% and 3% by weight of polyethylene.

9. A molding composition according to claim 1 containing between 1% and 50% by weight of poly(ethylene terephthalate).

10. A molding composition according to claim 1 which contains between 1% and 60%, based on the polymer content of said composition, of a fibrous reinforcing agent.

11. A molding composition according to claim 10 wherein the fibrous reinforcing agent is glass fibers.

12. A molding composition according to claim 1 containing 0.1% to 1.0% of an agent stabilizing the polymer content of said composition towards heat.

13. A molding composition according to claim 1 containing 1% to 20% by weight of a component or components decreasing the combustibility of said composition.

14. A molding composition according to claim 13 wherein said components are $Sb_2O_3$ and decabromodiphenyl ether.

15. A molding composition according to claim 13 wherein said components are tetrabromobisphenol A/bisphenol A copolycarbonate and antimony oxide.

16. A molding composition according to claim 13 wherein said components are tetrabromobisphenol A carbonate oligomer capped with tribromophenol and antimony oxide.

17. An article molded from a composition according to claim 1.

18. An article molded from a composition according to claim 7.

19. An article molded from a composition according to claim 9.

* * * * *

UNITED STATES PATENT AND TRADEMARK OFFICE
CERTIFICATE OF CORRECTION

PATENT NO. : 4,369,280
DATED : January 18, 1983
INVENTOR(S) : Dieck et al.

It is certified that error appears in the above-identified patent and that said Letters Patent are hereby corrected as shown below:

Column 4, line 59, "12,4000" in column D should read --12,400--.

Column 5, in the chart under Properties, "$DTUL^1$" should read --$DTUL^4$--.

Signed and Sealed this

Fifth Day of July 1983

[SEAL]

Attest:

Attesting Officer

GERALD J. MOSSINGHOFF

Commissioner of Patents and Trademarks